(12) United States Patent
Feng et al.

(10) Patent No.: US 10,381,681 B2
(45) Date of Patent: Aug. 13, 2019

(54) ELECTROLYTE AND LITHIUM-ION BATTERY CONTAINING THE SAME

(71) Applicant: CONTEMPORARY AMPEREX TECHNOLOGY CO., LIMITED, ZhangWan Town, JiaoCheng District (CN)

(72) Inventors: Shaowei Feng, Ningde (CN); Songjun Shi, Ningde (CN); Changlong Han, Ningde (CN)

(73) Assignee: CONTEMPORARY AMPEREX TECHNOLOGY CO., LIMITED, Zhangwan Town (CN)

( * ) Notice: Subject to any disclaimer, the term of this patent is extended or adjusted under 35 U.S.C. 154(b) by 60 days.

(21) Appl. No.: 15/606,387

(22) Filed: May 26, 2017

(65) Prior Publication Data

US 2017/0346132 A1    Nov. 30, 2017

(30) Foreign Application Priority Data

May 26, 2016   (CN) .......................... 2016 1 0355485

(51) Int. Cl.

| | | |
|---|---|---|
| *H01M 4/02* | (2006.01) | |
| *H01M 4/62* | (2006.01) | |
| *H01M 4/66* | (2006.01) | |
| *H01M 4/131* | (2010.01) | |
| *H01M 4/133* | (2010.01) | |
| *H01M 4/525* | (2010.01) | |
| *H01M 4/587* | (2010.01) | |
| *H01M 10/0525* | (2010.01) | |
| *H01M 10/0567* | (2010.01) | |
| *H01M 10/0568* | (2010.01) | |
| *H01M 10/0569* | (2010.01) | |

(52) U.S. Cl.
CPC ....... *H01M 10/0525* (2013.01); *H01M 4/131* (2013.01); *H01M 4/133* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0567* (2013.01); *H01M 10/0568* (2013.01); *H01M 10/0569* (2013.01); *H01M 2004/027* (2013.01)

(58) Field of Classification Search
None
See application file for complete search history.

(56) References Cited

U.S. PATENT DOCUMENTS

2013/0089778 A1 *   4/2013   Ihara ................. H01M 10/0569
429/200

FOREIGN PATENT DOCUMENTS

| CN | 102356499 A |   | 2/2012 |
|---|---|---|---|
| CN | 103035949 A |   | 4/2013 |
| CN | 104733779 A | * | 6/2015 |
| CN | 104953177 A |   | 9/2015 |

OTHER PUBLICATIONS

First Office Action, dated Dec. 11, 2017, by SIPO, re Chinese Patent Application No. 201610355485.5.

* cited by examiner

*Primary Examiner* — Daniel S Gatewood
(74) *Attorney, Agent, or Firm* — Perry + Currier Inc.

(57) ABSTRACT

The present application relates to the technical field of lithium-ion batteries and, specifically, relates to an electrolyte and a lithium-ion battery containing the electrolyte. The electrolyte of the present application comprises an organic solvent, a lithium salt and an additive, wherein the additive contains a cyanosulfone compound and a lithium fluorophosphate compound. When the electrolyte contains both the cyanosulfone compound and the lithium fluorophosphate at the same time, the cyanosulfone compound will form a passive film on the surface of the electrode of a high-voltage battery, so as to effectively suppress reaction between the electrolyte and the electrode, further, the lithium fluorophosphate can effectively suppress the decomposition of the lithium salt and improve the film resistance of the electrode. Under the synergistic effect of the two, the cycle performance of the lithium-ion battery is greatly improved, and the storage performance of the electrolyte is also significantly improved.

13 Claims, No Drawings

ELECTROLYTE AND LITHIUM-ION BATTERY CONTAINING THE SAME

CROSS-REFERENCE TO RELATED APPLICATIONS

The present application claims priority to Chinese Patent Application No. 201610355485.5, filed on May 26, 2016, the content of which is incorporated herein by reference in its entirety.

TECHNICAL FIELD

The present application relates to the technical field of lithium-ion batteries and, specifically, relates to an electrolyte and a lithium-ion battery containing the electrolyte.

BACKGROUND

In recent years, portable products using battery, such as cameras, digital video cameras, mobile phones, laptops and so on, have been widely used in people's daily life. Developing trends and demands of the battery product industry requires the batteries to have smaller size, lighter weight and longer service life. Thus, it is an urgent need for the industry to develop suitable power supply products for portable electronic devices, particularly a secondary battery having high energy density and light weight.

During initial charging/discharging of a lithium-ion battery, a layer of SEI film will be formed on a surface of a negative electrode of the lithium-ion battery. If the formed SEI film is too thick and has higher resistance, a lithium ion cannot pass through the SEI film and thus lithium precipitation will occur. During cycling, if the formed SEI film is not compact and stable enough, the formed SEI film will gradually dissolve or rupture, and the negative electrode being exposed will continue reacting with the electrolyte, which causes that the electrolyte is consumed and the battery capacity is decreased. Thus, the quality of the SEI film is substantially crucial to performance of the lithium-ion battery. Since quality and film resistance of the SEI film vary due to different additives or different amounts of the same additive in the electrolyte, it will be necessary to improve the quality of the SEI film by adjusting the additive and the amount thereof to obtain a lithium-ion battery with high performance.

In view of the above, the present application is provided.

SUMMARY

A primary invention objective of the present application is to propose an electrolyte.

A second invention objective of the present application is to propose a lithium-ion battery including the electrolyte.

In order to accomplish the present application, technical solutions adopted include:

The present application relates to an electrolyte, and the electrolyte includes an organic solvent, a lithium salt and an additive, wherein the additive comprises additive A and additive B, wherein the additive A is at least one cyanosulfone compound and the additive B is at least one lithium fluorophosphate compound.

Preferably, a structural formula of the cyanosulfone compounds is shown as Formula I:

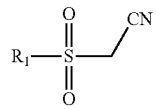

wherein $R_1$ is selected from a group consisting of halogen, $C_{1\sim20}$ alkyl, $C_{2\sim20}$ alkynel, $C_{6\sim26}$ aryl, $C_{5\sim26}$ heteroaryl, $C_{1\sim20}$ alkoxy, $C_{6\sim26}$ aryloxy, $C_{1\sim20}$ alkylsulfonyl, $C_{2\sim20}$ alkynelsulfonyl, $C_{6\sim26}$ arylsulfonyl, $C_{1\sim20}$ alkylsulfonyloxy and $C_{6\sim26}$ arylsulfonyloxy;

each of the $C_{1\sim20}$ alkyl, the $C_{2\sim20}$ alkynel, the $C_{6\sim26}$ aryl, the $C_{5\sim26}$ heteroaryl, the $C_{1\sim20}$ alkoxy, the $C_{6\sim26}$ aryloxy, the $C_{1\sim20}$ alkylsulfonyl, the $C_{2\sim20}$ alkynelsulfonyl, the $C_{6\sim26}$ arylsulfonyl, the $C_{1\sim20}$ alkylsulfonyloxy and the $C_{6\sim26}$ arylsulfonyloxy is substituted or unsubstituted by a substituting group; and the substituting group is selected from a group consisting of halogen and cyano.

Preferably, $R_1$ in Formula I is selected from a group consisting of halogen, $C_{1\sim6}$ alkyl, $C_{6\sim12}$ aryl and $C_{5\sim11}$ heteroaryl, and each of the $C_{1\sim6}$ alkyl, the $C_{6\sim12}$ aryl and the $C_{5\sim11}$ heteroaryl is substituted or unsubstituted by a substituting group, wherein the substituting group is selected from a group consisting of halogen and cyano.

Preferably, the cyanosulfone compound is selected from a group consisting of compounds shown as the following structural formulas and combinations thereof;

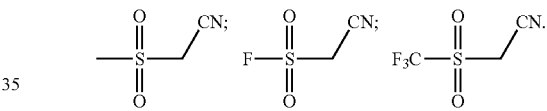

Preferably, the lithium fluorophosphate compound is selected from a group consisting of lithium monofluorophosphate, lithium bifluorophosphate and combinations thereof.

Preferably, a content of the cyanosulfone compound is 0.05%~3% by weight of the electrolyte, and preferably is 0.1%~2% by weight of the electrolyte.

Preferably, a content of the lithium fluorophosphate compound is 0.001%~2% by weight of the electrolyte, and preferably is 0.01%~1% by weight of the electrolyte.

Preferably, the organic solvent is selected from a group consisting of ethylene carbonate, propylene carbonate, 2,3-butylene carbonate, uluoroethylene carbonate, ethyltnethyl carbonate, dimethyl carbonate, diethyl carbonate, dipropyl carbonate, methyl propyl carbonate, ethyl propyl carbonate, γ-butyrolactone, methyl propionate, methyl butyrate, ethyl acetate, ethyl propionate, propyl propionate, ethyl butyrate and combinations thereof.

Preferably, the lithium salt is selected from a group consisting of lithium hexafluorophosphate, lithium tetrafluoroborate, lithium perchlorate, lithium hexafluoroarsenate, lithium oxalyltetrafluoro phosphate (LiTFOP), LiN(SO$_2$R$_F$)$_2$, LiN(SO$_2$F)(SO$_2$R$_F$), lithium bis(trifluoromethanesulphonyl)imide, lithium bis(fluorosulfonyl)imide, lithium bis(oxalate)borate, lithium oxalyldifluoroborate and combinations thereof; and the lithium salt is preferably selected from a group consisting of LiPF$_6$, LiN(SO$_2$R$_F$)$_2$ and combinations thereof; wherein $R_F$=$C_nF_{2n+1}$, n is an integer within 1~10; and a concentration of the lithium salt in the electrolyte is preferably 0.5 mol·L$^{-1}$~2 mol·L$^{-1}$.

The present application further relates to a lithium-ion battery, the lithium-ion battery includes a positive electrode plate, a negative electrode plate, a separator and the electrolyte of the present application; the positive electrode plate includes a positive electrode active material, and the negative electrode plate includes a negative electrode active material.

The technical solutions of the present application have at least the following beneficial effects:

When the electrolyte includes both the cyanosulfone compound and the lithium fluorophosphate, cycle performance and storage performance of the battery can be improved at the same time. Upon research, it is found that, when the electrolyte includes both the above-mentioned cyanosulfone compound and lithium fluorophosphate, the cyanosulfone compound can form a passive film on a surface of the electrolyte plate of the battery of high voltage, so that a reaction between the electrolyte and the electrolyte plate is effectively suppressed, moreover, the lithium fluorophosphate can effectively suppress the decomposition of the lithium salt and improve impedance of the electrode plate. Under synergistic effect of the cyanosulfone compound and lithium fluorophosphate, the cycle performance of the lithium-ion battery is significantly improved, e.g., the lithium-ion battery has excellent cycle performance under a high voltage of 4.4V at 45° C., further, the storage performance of the battery is also significantly improved.

DESCRIPTION OF EMBODIMENTS

The present application is further described by exemplary embodiments incorporated. It should be understood that, these exemplary embodiments are merely used to illustrate the present application but not to limit the scope of the present application.

The present application provides an electrolyte. The electrolyte includes an organic solvent, a lithium salt and an additive. The additive includes additive A and additive B. The additive A is at least one cyanosulfone compound, and the additive B is at least one lithium fluorophosphate compound. The cyanosulfone compound of the present application refers to a compound having a sulfuryl group and a cyano group as the main functional groups. If the electrolyte of a lithium-ion battery includes both the cyanosulfone compound and the lithium fluorophosphate, the lithium-ion battery will have improved cycle performance and improved storage performance at the same time.

Upon researches, it is found that, when the electrolyte includes both the cyanosulfone compound and the lithium fluorophosphate, the cyanosulfone compound will form a passive film on a surface of an electrode plate of a high-voltage battery, which can effectively suppress reaction between the electrolyte and the electrode plate, further, the lithium fluorophosphate can effectively suppress the decomposition of the lithium salt and improve the film resistance of the electrode plate. Under synergistic effect of the cyanosulfone compound and the lithium fluorophosphate, cycle performance of the lithium-ion battery is greatly improved, for example, the lithium-ion battery has excellent cycle performance at 4.4V high voltage and 45° C., and storage performance of the electrolyte is also significantly improved.

As an improvement to the electrolyte of the present application, a structure of the cyanosulfone compound is shown as Formula II:

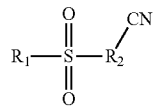

wherein $R_1$ is selected from a group consisting of halogen, $C_{1\sim20}$ alkyl, $C_{2\sim20}$ alkynel, $C_{6\sim26}$ aryl, $C_{5\sim26}$ heteroaryl, $C_{1\sim20}$ alkoxy, $C_{6\sim26}$ aryloxy, $C_{1\sim20}$ alkylsulfonyl, $C_{2\sim20}$ alkynelsulfonyl, $C_{6\sim26}$ arylsulfonyl, $C_{1\sim20}$ alkylsulfonyloxy and $C_{6\sim26}$ arylsulfonyloxy;

$R_2$ is selected from a group consisting of $C_{1\sim6}$ alkylene and $C_{2\sim6}$ alkenylene;

each of the $C_{1\sim20}$ alkyl, the $C_{2\sim20}$ alkynel, the $C_{6\sim26}$ aryl, the $C_{5\sim26}$ heteroaryl, the $C_{1\sim20}$ alkoxy, the $C_{6\sim26}$ aryloxy, the $C_{1\sim20}$ alkylsulfonyl, the $C_{2\sim20}$ alknelsulfonyl, the $C_{6\sim26}$ arylsulfonyl, the $C_{1\sim20}$ alkylsulfonyloxy, the $C_{6\sim26}$ aryl sulfonyloxy, the $C_{1\sim6}$ alkylene and the $C_{2\sim6}$ alkenylene is substituted or unsubstituted by a substituting group; and the substituting group is selected from a group consisting of halogen and cyano.

As an improvement to the electrolyte of the present application, $R_2$ is selected from a group consisting of substituted or unsubstituted $C_{1\sim3}$ alkylene and substituted or unsubstituted $C_{2\sim3}$ alkenylene.

As an improvement to the electrolyte of the present application, a structure of the cyanosulfone compound is shown as Formula I:

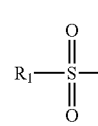

wherein $R_1$ is the same as described in Formula II.

In the present application:

The $C_{1\sim20}$ alkyl may be a chainlike alkyl or a cyclic alkyl, and a hydrogen on a ring of the cyclic alkyl can be substituted by an alkyl. A lower limit value of the number of carbon atom in the alkyl is preferably 2, 3, 4 or 5, and an upper limit value of the number of carbon atom in the alkyl is preferably 3, 4, 5, 6, 8, 10, 12, 14, 16 or 18. It is preferred to select a $C_{1\sim10}$ alkyl, more preferably a $C_{1\sim6}$ chainlike alkyl or a $C_{3\sim8}$ cyclic alkyl, further more preferably a $C_{1\sim4}$ chainlike alkyl or a $C_{5\sim7}$ cyclic alkyl. Examples of the alkyl may include: methyl, ethyl, n-propyl, iso-propyl, n-butyl, iso-butyl, sec-butyl, tert-butyl, n-pentyl, iso-pentyl, neopentyl, cyclo-pentyl, cyclohexyl.

The $C_{2\sim20}$ alkynel may be a cyclic alkynel or a chainlike alkynel. The $C_{2\sim20}$ alkynel preferably has only one double bond. A lower limit value of the number of carbon atom in the alkynel is preferably 3, 4 or 5, and an upper limit value of the number of carbon atom in the alkynel is preferably 3, 4, 5, 6, 8, 10, 12, 14, 16 or 18. It is preferred to select a $C_{2\sim10}$ alkynel, more preferably a $C_{2\sim6}$ alkynel, further more preferably a $C_{2\sim5}$ alkynel. Examples of the $C_{2\sim20}$ alkynel may include: vinyl, allyl, isopropenyl, pentenyl, cyclohexenyl, cycloheptenyl and cyclo-octenyl.

The $C_{6\sim26}$ aryl may be a phenyl, a phenylalkyl, an aryl containing at least one phenyl, e.g., a biphenyl or a polycyclic aromatic group such as naphthyl, anthryl and phenanthryl, and a hydrogen of the biphenyl and the polycyclic aromatic group can be substituted by an alkyl or an alkynel.

It is preferred to select a $C_{6\sim16}$ aryl, more preferably a $C_{6\sim14}$ aryl, and further preferably a $C_{6\sim9}$ aryl. Examples of the aryl may include: phenyl, benzyl, biphenyl, p-tolyl, o-tolyl and m-tolyl.

The $C_{1\sim20}$ alkoxy refers to a $C_{1\sim20}$ alkyl containing an oxygen atom. It is preferred to select a $C_{1\sim10}$ alkoxy, more preferably a $C_{1\sim6}$ alkoxy, and further preferably a $C_{1\sim4}$ alkoxy. Examples of the alkoxy may include: methoxy, ethoxy, n-propoxy, iso-propoxy, n-butoxy, sec-butoxy, tert-butoxy, n-pentyloxy, iso-pentyloxy, cyclopentyloxy and cyclohexyloxy.

The $C_{6\sim26}$ aryloxy refers to a $C_{6\sim26}$ aryl containing an oxygen atom. It is preferred to select a $C_{6\sim16}$ aryloxy, more preferably a $C_{6\sim14}$ aryloxy, and further preferably a $C_{6\sim10}$ aryloxy. Examples of the aryloxy may include: phenoxy, benzyloxy, 4-methylphenoxy, 3,5-dimethylphenoxy, 4-methylbenzyloxy, 3-methylbenzyloxy, 2,6-diisopropyl-benzyloxy and 1-naphthyloxy.

When a hydrogen of the $C_{1\sim20}$ alkyl, the $C_{2\sim10}$ alkynel, the $C_{6\sim26}$ aryl, the $C_{1\sim20}$ alkoxy or the $C_{6\sim26}$ aryloxy is substituted by a halogen atom, a halogenated group, i.e., a halogenated $C_{1\sim20}$ alkyl, a halogenated $C_{2\sim10}$ alkynel, a halogenated $C_{6\sim26}$ aryl, a halogenated $C_{1\sim20}$ alkoxy or a halogenated $C_{6\sim26}$ aryloxy will be formed accordingly. The halogen is selected from a group consisting of F, Cl and Br, and preferably selected from a group consisting of F and Cl. The halogen atom may substitute part or all of the hydrogens of the $C_{1\sim20}$ alkyl, the $C_{2\sim10}$ alkynel, the $C_{6\sim26}$ aryl, the $C_{1\sim20}$ alkoxy or the $C_{6\sim26}$ aryloxy, and the number of the halogen atom in the formed halogenated group may be 1, 2, 3 or 4.

It is preferred to select a halogenated $C_{1\sim10}$ alkyl, a halogenated $C_{2\sim10}$ alkynel, a halogenated aryl, a halogenated $C_{1\sim10}$ alkoxy or a halogenated $C_{6\sim16}$ aryloxy, more preferably a halogenated $C_{1\sim6}$ chainlike alkyl, a halogenated $C_{3\sim8}$ cycloalkyl, a halogenated $C_{2\sim6}$ alkynel, a halogenated $C_{6\sim14}$ aryl, a halogenated. $C_{1\sim6}$ alkoxy or a halogenated $C_{6\sim14}$ aryloxy, further more perferably a halogenated $C_{1\sim4}$ chainlike alkyl, a halogenated $C_{5\sim7}$ cycloalkyl, a halogenated $C_{2\sim5}$ alkynel, a halogenated $C_{6\sim10}$ aryl, a halogenated $C_{1\sim4}$ alkoxy or a halogenated $C_{6\sim10}$ aryloxy Examples of the halogenated group may include: trifluoromethyl (—$CF_3$), 2-fluoroethyl, 3-fluoro-n-propyl, 2-fluoroisopropyl, 4-fluoro-n-butyl, 3-fluorosecbutyl, 5-fluoro-n-pentyl, 4-fluoroisopentyl, 1-fluorovinyl, 3-fluoroallyl, 6-fluoro-4-hexenyl, 2-fluorophenyl, 4-fluorophenyl, 3-fluorophenyl, 4-fluoromethylphenyl, 2,6-difluoromethylphenyl, 2-fluoro-1-naphthyl, fluoromethoxy, 1-fluoroethoxy, 2-fluoro-n-propoxy, 1-fluoroisopropoxy, 3-fluoro-n-butoxy, 4-fluoro-n-pentyloxy, 2,2-difluoromethylpropoxy, 5-fluoro-n-hexyloxy, 1,1,2-trifluoromethylpropoxy, 6-fluoro-n-heptyloxy, 7-fluoro-n-octyloxy, 3-fluoro-cyclopentyloxy, 4-fluoro-2-methylcyclopentyloxy, 3-fluoro-cyclohexyloxy, 3-fluoro-cycloheptyloxy 4-fluoro-2-methylcycloheptyloxy, 3-fluorocyclooctyloxy, 4-fluorophenoxy, 3-fluorophenoxy, 2-fluorophenoxy, 3,5-difluorophenoxy, 2,6-difluorophenoxy, 2,3-difluorophenoxy, 2,6-difluoro-4-methylphenoxy, 3-(2-fluoroethyl)phenoxy, 2-(1-fluoroethyl)phenoxy, 3,5-difluorobenzyloxy, 2-fluorobenzyloxy, 2-fluoro-1-naphthyloxy. In the above examples, F can be substituted by Cl and/or Br.

After the $C_{1\sim20}$ alkyl, $C_{2\sim10}$ alkynel and $C_{6\sim26}$ aryl are respectively substituted with a sulfonic acid group or a sulfonyl, then a sulfoalkyl, a sulfoalkynel, a sulfoaryl, a methylsulfonyl, a alkynelsulfonyl and a arylsulfonyl will be formed accordingly. The sulfonic acid group may substitute part or all of the hydrogen atoms in the $C_{1\sim20}$ alkyl, $C_{2\sim10}$ alkynel and $C_{6\sim26}$ aryl, and the number of the sulfonic acid group in the formed sulfoalkyl, sulfoalkynel or sulfoaryl may be 1 or 2. Similarly, the sulfonyl may substitute part or all of the hydrogen atoms in the $C_{1\sim20}$ alkyl, $C_{2\sim10}$ alkynel and $C_{6\sim26}$ aryl, and the number of the sulfonyl in the formed methylsulfonyl, alkynelsulfonyl or arylsulfonyl may be 1 or 2.

Examples containing the sulfonyl may include: methylsulfonyl, ethylsulfonyl, n-propylsulfonyl, isopropylsulfonyl, n-butylsulfonyl, isobutylsulfonyl, tertbutysulfonyl, n-pentylsulfonyl, isopentylsulfonyl, neopentylsulfonyl, 2,3-dimethylpropylsulfonyl, 1-ethylproplsulfonyl, n-hexylsulfonyl, cyclopentylsulfonyl, cyclohexylsulfonyl, cycloheptylsulfonyl, cyclooctylsulfonyl, n-heptylstilfonyl, n-octylsulfonyl, propenylsulfonyl, butenylsulfonyl, pentenylsulfonyl, hexenylsulfonyl, heptenylsulfonyl, octenylsulfonyl, phenylsulfonyl, (4-methylphenyl)sulfonyl.

Examples containing the sulfonic acid group may include: sulfomethyl, 2-sulfoethyl, 3-sulfo-n-propyl, 4-sulfo-n-butyl, sulfotertbutyl, 2-sulfo-n-pentyl, 3-sulfoisopentyl, 6-sulfo-n-hexyl, 2-sulfocyclopentyl, 4-sulfocyclohexyl, sulfopropenyl, sulfobutenyl, sulfopentenyl, sulfohexenyl, sulfoheptenyl, sulfooctenyl, sulfophenyl, (4-sulfomethyl) phenyl.

The $C_{1\sim6}$ alkylene is a straight or branched alkylene, of which a lower limit value of the number of carbon atom is preferably 2 or 3, and a upper limit value of the number of carbon atoms is preferably 4, 5 or 6. It is preferred to select a $C_{1\sim4}$ alkylene. Examples of the $C_{1\sim6}$ alkylene may include: methylene, ethylidene, propylidene, isopropylidene, butylidene, isobutylidene, sec-butylidene, pentylidene, hexylidene.

The $C_{2\sim6}$ alkenylene is a straight or branched alkenylene. The $C_{2\sim6}$ alkenylene preferably has only one double bond. A lower limit value of the number of carbon atom in the $C_{2\sim6}$ alkenylene is preferably 3 or 4, and an upper limit value of the number of carbon atom in the $C_{2\sim6}$ alkenylene is preferably 3, 4, 5 or 6. It is preferred to select a $C_{2\sim5}$ alkylene. Examples of the $C_{2\sim6}$ alkenylene may include: vinylidene, acrol, isopropenylidene, butenylidene, pentamethylene.

The halogen atom is selected from a group consisting of F, Cl and Br, and is preferably selected from a group consisting of F and Cl.

As an improvement to the electrolyte of the present application, $R_1$ is selected from a group consisting of $C_{1\sim6}$ alkyl, $C_{6\sim12}$ aryl and $C_{5\sim11}$ heteroaryl; the $C_{1\sim6}$ alkyl, $C_{6\sim12}$ aryl and $C_{5\sim11}$ heteroaryl are substituted or unsubstituted with a substituting group, and the substituted group is selected from a group consisting of halogen atom and cyano.

As an improvement to the electrolyte of the present application, the cyanosulfone compound is selected from a group consisting of compounds shown as the following structural formulas and combinations thereof:

Compound 1

Compound 2

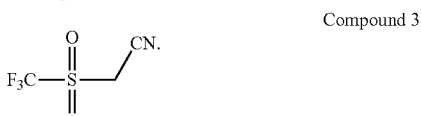

Compound 3

As an improvement to the electrolyte of the present application, the cyanosulfone compound can also be selected from a group consisting of:

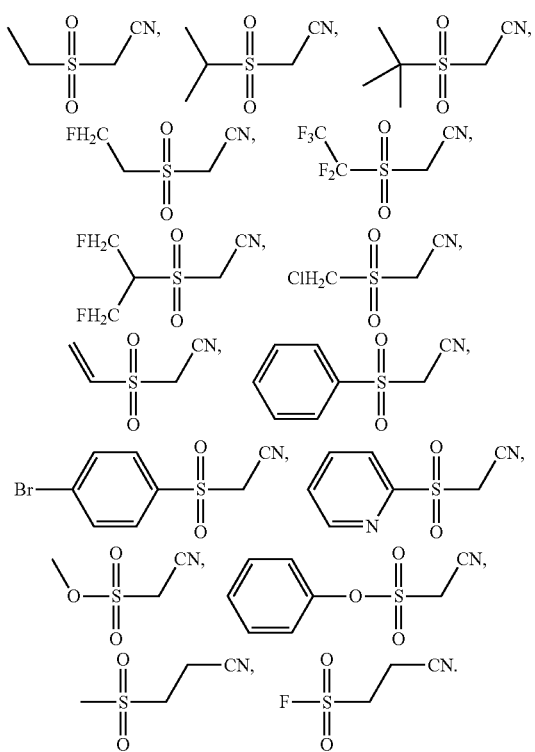

In the present application, the mentioned cyanosulfone compound can be synthesized according to conventional methods or commercially purchased.

As an improvement to the electrolyte of the present application, the lithium fluorophosphate compound is selected from a group consisting of lithium monofluorophosphate, lithium bifluorophosphate and combinations thereof; a chemical formula of lithium monofluorophosphate is $Li_2PO_3F$ and a chemical formula of lithium bifluorophosphate is $LiPO_2F_2$.

In the present application, the lithium fluorophosphate can be synthesized according to conventional methods, for example, synthesized with reference to Japanese Patent document 2008-140767.

As an improvement to the electrolyte of the present application, a content of the cyanosulfone compound is 0.05%~3% by weight of the electrolyte; an upper limit value of the content is 1.5%, 2.0% or 2.5%, a lower limit value of the content includes 0.1%, 0.25% or 0.5%, and the content of the cyanosulfone compound may be in a range defined by any one of the upper limit values and any one of the lower limit values. Preferably, the content of the cyanosulfone compound is 0.1%~2% by weight of the electrolyte.

As an improvement to the electrolyte of the present application, a content of the lithium fluorophosphate is 0.001%~2% by weight of the electrolyte. An upper limit value of the content is 0.75%, 1%, 1.25%, 1.5% or 1.75%, a lower limit value of the content is 0.001%, 0.005%, 0.01%, 0.05%, 0.1% or 0.2%, and the content of the lithium fluorophosphate may be in a range defined by any one of the upper limit values and any one of the lower limit values. Preferably, the content of the lithium fluorophosphate is 0.01%~1% by weight of the electrolyte.

If the content of the cyanosulfone compound in the electrolyte or the content of the lithium fluorophosphate in the electrolyte is excessively great, a thick SEI film will be formed on the surfaces of the positive electrode plate and the negative electrode plate, which will reduce conduction performance of the lithium ion, and worsen cycle performance and storage performance of the lithium-ion battery.

If the content of the cyanosulfone compound in the electrolyte is too small, the cycle performance, especially cycle performance at a high pressure, of the lithium-ion battery cannot be effectively improved. However, a too small content of the lithium fluorophosphate cannot help to stabilize the lithium salt or improve the performance of the battery either.

As an improvement to the electrolyte of the present application, the organic solvent in the electrolyte may be a non-aqueous organic solvent, and the organic solvent is selected from a group consisting of compounds including 1~8 carbon atoms and at least one ester group. Preferably, the organic solvent is selected from a group consisting of ethylene carbonate, propylene carbonate, 2,3-butylene carbonate, fluoroethylene carbonate, ethylmethyl carbonate, ditnethyl carbonate, diethyl carbonate, dipropyl carbonate, methyl propyl carbonate, ethyl propyl cartbonate, γ-butyrolactone, methyl propionate, methyl butyrate, ethyl acetate, ethyl propionate, propyl propionate, ethyl butyrate and combinations thereof.

As an improvement to the electrolyte of the present application, the lithium salt may be an organic lithium salt or an inorganic lithium salt. Specifically, the lithium salt may include at least one of fluorine element, boron element and phosphorus element. Preferably, the lithium salt is selected from a group consisting of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium oxalyltetrafluoro phosphate (LiTFOP), $LiN(SO_2R_F)_2$, $LiN(SO_2F)(SO_2R_F)$, lithium bis(trifluoromethanesulphony)imide ($LiN(CF_3SO_2)_2$, abbreviated as LiTFSI), lithium bis(fluorosulfonyl)imide ($Li(N(SO_2F)_2)$, abbreviated as LiFSI), lithium bis(oxalate)borate ($LiB(C_2O_4)_2$, abbreviated as LiBOB), lithium oxalyldifluoroborate ($LiBF_2(C_2O_4)$, abbreviated as LiDFOB) and combinations thereof, wherein $R_F$ is a saturated perfluoroalkyl $—C_nF_{2n+1}$, n represents an integer within 1~10, and 2n+1 represents an integer greater than zero. Particularly, the lithium salt is preferably $LiPF_6$ and/or $LiN(SO_2R_F)_2$.

As an improvement to the electrolyte of the present application, the concentration of the lithium salt in the electrolyte is 0.5M~2M (M=mol/L).

In the present application, the electrolyte can be prepared by a conventional method, for example, the electrolyte can be prepared by mixing an organic solvent, a lithium salt and an additive.

Another object of the present application is to provide a lithium-ion battery. The lithium-ion battery includes the electrolyte according to the present application, a positive electrode plate including a positive electrode active material, a negative electrode plate including a negative electrode active material, and a separator.

As an improvement to the lithium-ion battery of the present application, the positive electrode plate further includes a binder and a conductive agent. The positive electrode is obtained by coating a positive electrode slurry including the positive electrode active material, the binder and the conductive agent on a positive electrode current collector, and then drying. Similarly, the negative electrode is obtained by coating a negative electrode slurry including the negative electrode active material, a binder and a conductive agent on a negative electrode current collector, and then drying.

As an improvement to the lithium-ion battery of the present application, the positive electrode active material is selected from a group consisting of lithium iron phosphite, lithium cobaltate (LiCoO$_2$), lithium iron phosphate (LiFePO$_4$), lithium manganate (LiMnO$_2$), lithium-nickel-manganese-cobalt-containing composite oxide ternary material and combinations thereof. For example, the positive electrode active material may be a mixture of lithium cobaltate and lithium-nickel-manganese-cobalt-containing composite oxide ternary material. Examples of the lithium-nickel-manganese-cobalt-containing composite oxide ternary material may include: LiNi$_{1/3}$Co$_{1/3}$Mn$_{1/3}$O$_2$, lithium nickel cobalt manganese oxide LiNi$_{0.5}$Co$_{0.2}$Mn$_{0.3}$O$_2$, LiNi$_{0.6}$Co$_{0.2}$Mn$_{0.2}$O$_2$.

As an improvement to the lithium-ion battery of the present application, the negative electrode active material is a carbon material and/or a silicon-containing material, and is preferably graphite and/or silicon.

As an improvement to the lithium-ion battery of the present application, a type of the separator of the lithium-ion battery is not specifically limited. The separator can be a separator made of any commonly used material, for example, the separator may be a polyethylene separator, a polypropylene separator, a polyvinylidene fluoride separator or a composite of at least two of polyethylene layer, polypropylene layer and polyvinylidene fluoride layer, which is not limited thereto.

In the following exemplary embodiments, comparative examples and test examples, all used reagents, materials and instruments are conventional agents, conventional materials and conventional instruments, and all the reagents, materials and instruments could be commercially available. The regents used herein can also be synthesized by conventional manners.

In the following exemplary embodiments, comparative examples and test examples, the used materials are listed as follows:

Additive:

Cyanosulfone compound: the above-mentioned Compounds 1~3;

Lithium fluorophosphate: the above-mentioned lithium bifluorophosphate;

Lithium salt: lithium hexafluorophosphate (LiPF$_6$);

Organic solvent: ethylene carbonate (EC), ethylmethyl carbonate (EMC);

Positive electrode active material: lithium-nickel-manganese-cobalt-containing composite oxide ternary material (LiNi$_{1/3}$Co$_{1/3}$Mn$_{1/3}$O$_2$);

Separator: a porous polyethylene (PE) film.

Additive A for comparative examples:

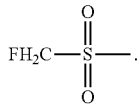

Embodiment 1: Preparation of Lithium-Ion Battery (Hereinafter Referred to as Battery)

Batteries 1~19 are prepared according to the following manner:

(1) Preparation of Negative Electrode Plate

The negative electrode active material of graphite, conductive agent of acetylene black, binder of styrene-butadiene rubber and thickener of sodium carboxymethylcellulose (CMC) are mixed in a weight ratio of graphite:acetylene black:styrene-butadiene rubber: sodium carboxymethylcellulose=95:2:2:1, then added with deionized water and fully stirred, so as to form an evenly mixed negative electrode slurry; the negative electrode slurry is then evenly coated onto a negative electrode current collector (i.e., a copper foil), dried and cold-pressed, so as to obtain a negative electrode plate.

(2) Preparation of Positive Electrode Plate

The positive electrode active of lithium-manganese-nickel-containing composite oxide ternary material, conductive agent of acetylene black, binder of polyvinylidene fluoride are mixed in a weight ratio of lithium-manganese-nickel-containing composite oxide ternary material:acetylene black:polyvinylidene fluoride=96:2:2, then added with a solvent of N-methylpyrrolidone and fully stirred, so as to form an evenly mixed positive electrode slurry; the positive electrode slurry is then coated onto a positive electrode (i.e., an aluminum foil), dried and then cold-pressed, so as to obtain a positive electrode plate (3) Preparation of Electrolyte Electrolytes 1~19 are prepared by the following manner:

In a glove box filled with argon atmosphere with a moisture content <10 ppm, EC and EMC are evenly mixed in a weight ratio of 3:7 to form an mixed solvent; the lithium salt LiPF$_6$ which has been fully dried is then dissolved into the abovementioned mixed solvent; the cyanosulfone compound and lithium fluorophosphate are then added into the mixed solvent and evenly stirred, so as to obtain an electrolyte, of which the concentration of LiPF$_6$ is 1 mol/L.

(4) Preparation of Battery

Batteries 1~19 are all prepared according to the following manner:

The positive electrode plate, separator and negative electrode plate are stacked in sequence and then winded to form a bare cell, such that the separator can separate the positive electrode plate from the negative electrode plate; the bare cell is then packaged into an external packaging foil, dried, then injected with the prepared electrolyte, vacuum sealed, let standby, formed and shaped, so as to obtain a battery.

In the preparation of the abovementioned batteries, the selected electrolyte in each of the batteries and the specific type and contents of the used cyanosulfone compound and lithium fluorophosphate in each of the electrolytes are shown in Table 1.

In Table 1, the content of the cyanosulfone compound and the content of the lithium fluorophosphate is weight percentage counted based on the total weight of the electrolyte.

TABLE 1

| Battery No. | Electrolyte No. | Cyanosulfone compound | | Lithium fluorophosphate | |
|---|---|---|---|---|---|
| | | Type | Content % | Type | Content % |
| Battery 1 | Electrolyte 1 | Compound 1 | 0.05 | lithium difluorophosphate | 0.5 |

TABLE 1-continued

| Battery No. | Electrolyte No. | Cyanosulfone compound Type | Content % | Lithium fluorophosphate Type | Content % |
|---|---|---|---|---|---|
| Battery 2 | Electrolyte 2 | Compound 1 | 0.1 | lithium difluorophosphate | 0.5 |
| Battery 3 | Electrolyte 3 | Compound 1 | 1 | lithium difluorophosphate | 0.5 |
| Battery 4 | Electrolyte 4 | Compound 1 | 2 | lithium difluorophosphate | 0.5 |
| Battery 5 | Electrolyte 5 | Compound 1 | 3 | lithium difluorophosphate | 0.5 |
| Battery 6 | Electrolyte 6 | Compound 1 | 2 | lithium difluorophosphate | 0.001 |
| Battery 7 | Electrolyte 7 | Compound 1 | 2 | lithium difluorophosphate | 0.1 |
| Battery 8 | Electrolyte 8 | Compound 1 | 2 | lithium difluorophosphate | 1 |
| Battery 9 | Electrolyte 9 | Compound 1 | 2 | lithium difluorophosphate | 2 |
| Battery 10 | Electrolyte 10 | Compound 2 | 0.05 | lithium difluorophosphate | 0.5 |
| Battery 11 | Electrolyte 11 | Compound 2 | 0.1 | lithium difluorophosphate | 0.5 |
| Battery 12 | Electrolyte 12 | Compound 2 | 1 | lithium difluorophosphate | 0.5 |
| Battery 13 | Electrolyte 13 | Compound 2 | 2 | lithium difluorophosphate | 0.5 |
| Battery 14 | Electrolyte 14 | Compound 2 | 3 | lithium difluorophosphate | 0.5 |
| Battery 15 | Electrolyte 15 | Compound 3 | 0.05 | lithium difluorophosphate | 0.5 |
| Battery 16 | Electrolyte 16 | Compound 3 | 0.1 | lithium difluorophosphate | 0.5 |
| Battery 17 | Electrolyte 17 | Compound 3 | 1 | lithium difluorophosphate | 0.5 |
| Battery 18 | Electrolyte 18 | Compound 3 | 2 | lithium difluorophosphate | 0.5 |
| Battery 19 | Electrolyte 19 | Compound 3 | 3 | lithium difluorophosphate | 0.5 |

Preparation of lithium-ion batteries (hereinafter referred to as batteries) $1^{\#}$~$18^{\#}$ of comparative examples 1~18

Comparative Examples 1~18

Batteries $1^{\#}$~$18^{\#}$ are prepared according to the following manner:

Batteries $1^{\#}$~$18^{\#}$ are prepared according to the preparing conditions of battery 1, except that the type and the content of the cyanosulfone compound are different and/or the content of the lithium difluorophosphate is different.

In the preparation of the abovementioned batteries, the selected electrolyte in each of the batteries and the type and content of the used cyanosulfone compound and lithium difluorophosphate in each of the electrolyte are shown in Table 2.

In Table 2, the content of the cyanosulfone compound and the content of the lithium fluorophosphate is weight percentage counted based on the total weight of the electrolyte.

TABLE 2

| Battery No. | Electrolyte No. | Cyanosulfone compound Type | Content % | Lithium fluorophosphate compound Type | Content % |
|---|---|---|---|---|---|
| Battery $1^{\#}$ | Electrolyte $1^{\#}$ | — | — | — | — |
| Battery $2^{\#}$ | Electrolyte $2^{\#}$ | — | — | lithium difluorophosphate | 0.5 |
| Battery $3^{\#}$ | Electrolyte $3^{\#}$ | Compound 1 | 2 | — | — |
| Battery $4^{\#}$ | Electrolyte $4^{\#}$ | Compound 1 | 0.01 | lithium difluorophosphate | 0.0005 |
| Battery $5^{\#}$ | Electrolyte $5^{\#}$ | Compound 1 | 0.01 | lithium difluorophosphate | 0.5 |
| Battery $6^{\#}$ | Electrolyte $6^{\#}$ | Compound 1 | 0.01 | lithium difluorophosphate | 3 |
| Battery $7^{\#}$ | Electrolyte $7^{\#}$ | Compound 1 | 2 | lithium difluorophosphate | 0.0005 |
| Battery $8^{\#}$ | Electrolyte $8^{\#}$ | Compound 1 | 4 | lithium difluorophosphate | 0.0005 |
| Battery $9^{\#}$ | Electrolyte $9^{\#}$ | Compound 1 | 4 | lithium difluorophosphate | 3 |
| Battery $10^{\#}$ | Electrolyte $10^{\#}$ | Compound 2 | 2 | — | — |

TABLE 2-continued

| Battery No. | Electrolyte No. | Cyanosulfone compound | | Lithium fluorophosphate compound | |
|---|---|---|---|---|---|
| | | Type | Content % | Type | Content % |
| Battery 11# | Electrolyte 11# | Compound 2 | 0.01 | lithium difluorophosphate | 0.0005 |
| Battery 12# | Electrolyte 12# | Compound 2 | 4 | lithium difluorophosphate | 0.0005 |
| Battery 13# | Electrolyte 13# | Compound 2 | 4 | lithium difluorophosphate | 3 |
| Battery 14# | Electrolyte 14# | Compound 3 | 2 | — | — |
| Battery 15# | Electrolyte 15# | Compound 3 | 0.01 | lithium difluorophosphate | 0.0005 |
| Battery 16# | Electrolyte 16# | Compound 3 | 4 | lithium difluorophosphate | 0.0005 |
| Battery 17# | Electrolyte 17# | Compound 3 | 4 | lithium difluorophosphate | 3 |
| Battery 18# | Electrolyte 18# | Additive A | 10 | — | — |

Noted:
in Table 2, "—" represents that no materials of any type is added.

Test Examples (1) Test for Storage Performance

High-temperature storage performance of the battery is characterized by a volume change rate of the battery after being stored.

The following test is conducted to each of the batteries obtained in the exemplary embodiments and the comparative examples:

At 25° C., the battery is firstly charged at 0.5 C constant current to 4.4V and then charged at 4.4V constant voltage to 0.025 C; then an initial volume of the battery is measured by a drainage method conducted in deionized water, and the obtained initial volume of the battery is recorded as a volume of the battery before storage; the battery is then stored at 85° C. for 6 hours and, subsequently, the volume of the battery after high-temperature storage is measured; the volume change rate of the battery is calculated according to the following formula. The tested results are shown in Table 3.

Volume change rate of a battery (%)=[volume of the battery after storage/volume of the battery before storage]×100%

(2) Test for Cycle Performance of Battery at High Temperature

The following test is conducted to each of the batteries obtained in the exemplary embodiments and the comparative examples:

At 45° C., the battery is charged at 1 C constant current to 4.4V and further charged at 4.4V constant voltage to 0.025 C, then discharged at 1 C constant current to 3.0V, so as to complete a cycle of charge-discharge; and the discharge capacity is recorded as a discharge capacity of a first cycle. The battery is charged-discharged as described above for a plurality of cycles, and a discharge capacity of a 100th cycle is measured, A capacity retention rate of the battery after cycling is calculated according to the following formula. The tested results are shown in Table 3.

Capacity retention rate of a battery after 100 cycles= (discharge capacity of the 100th cycle/discharge capacity of the first cycle)×100%

TABLE 3

| Battery No. | Test for storage performance at 85° C., Volume change rate (%) | Test for cycle performance Capacity retention rate at 45° C./% |
|---|---|---|
| Battery 1 | 91.5 | 64.4 |
| Battery 2 | 83.1 | 72.2 |
| Battery 3 | 77.0 | 77.6 |
| Battery 4 | 57.2 | 86.6 |
| Battery 5 | 52.1 | 73.7 |
| Battery 6 | 74.1 | 63.8 |
| Battery 7 | 73.5 | 72.9 |
| Battery 8 | 61.7 | 83.2 |
| Battery 9 | 62.1 | 59.5 |
| Battery 10 | 86.9 | 65.4 |
| Battery 11 | 81.7 | 68.3 |
| Battery 12 | 77.9 | 80.9 |
| Battery 13 | 56.6 | 86.4 |
| Battery 14 | 49.3 | 76.3 |
| Battery 15 | 85.4 | 65.5 |
| Battery 16 | 79.1 | 66.3 |
| Battery 17 | 78.8 | 82.3 |
| Battery 18 | 56.4 | 84.1 |
| Battery 19 | 48.5 | 76.4 |
| Battery 1# | 98.3 | 40.2 |
| Battery 2# | 93.4 | 50.6 |
| Battery 3# | 62.9 | 51.5 |
| Battery 4# | 93.9 | 48.8 |
| Battery 5# | 84.5 | 51.1 |
| Battery 6# | 98.9 | 36.3 |
| Battery 7# | 62.5 | 55.6 |
| Battery 8# | 44.8 | 33.1 |
| Battery 9# | 54.1 | 26.2 |
| Battery 10# | 63.9 | 51.3 |
| Battery 11# | 97.0 | 48.7 |
| Battery 12# | 46.1 | 31.0 |
| Battery 13# | 53.7 | 24.9 |
| Battery 14# | 70.9 | 51.1 |
| Battery 15# | 97.8 | 41.9 |
| Battery 16# | 46.4 | 30.5 |
| Battery 17# | 52.1 | 19.9 |
| Battery 18# | 78.9 | 35.6 |

Based on relevant data in Table 3, the following analysis is provided:

(1) Analysis on Test Results of Storage Performance at 85° C.

It can be seen from the test results of batteries 1#~3# and 4# that, the battery containing both the lithium difuorophosphate compound and the cyanosulfone compound has better storage performance when compared to the battery containing only one or none of the lithium difuorophosphate compound and the cyanosulfone compound.

Comparing the obtained test results of batteries 1~5, it can be seen that, when the content of the lithium difuorophosphate is 0.5%, the more the cyanosulfone compound is added, the better the storage performance of the battery is.

Comparing the obtained test results of batteries 4 and 6~9, it can be seen that, when the content of the cyanosulfone one compound is 2%, the storage performance of the battery is improved and then reduced with the increase of the content of the lithium difuorophosphate coordination compound.

In addition, batteries 10~19 show the same storage performance as above.

(2) Analysis on Test Results of Cycle Performance

Comparing the capacity retention rate of batteries 1~19 after cycling and the capacity retention rate of battery 1# after cycling, it can be seen that, when the electrolyte contains the cyanosulfone compound and the lithium difluorophosphate compound, the battery will have higher capacity retention rate and the battery will have excellent cycle performance at high temperature.

It can be seen from the capacity retention rates of batteries 1#~9# after cycling that, battery 1# has low capacity retention rate as the electrolyte in battery 1# does not include any of the additives and thus a plurality of side reactions occurs to the organic solvent on a surface of the electrode plate.

The electrolyte of battery 2# includes merely the lithium difluorophosphate compound and the electrolyte of battery 3# includes merely the cyanosulfone compound. However, the cycle performance of batteries 2# and 3# is not substantially improved, as the lithium difluorophosphate compound alone cannot effectively stabilize the lithium salt, and the SEI film formed by the cyanosulfone compound alone cannot effectively prevent the side reactions between the active materials and the electrolyte.

Each of batteries 4#, 5# and 7# includes both the cyanosulfone compound and the lithium difluorophosphate compound. However, the content of the cyanosulfone compound and/or the content of the lithium difluorophosphate compound are too small, the SEI film formed by the cyanosulfone compound of a small content cannot possess both compactness and stability and thus cannot effectively prevent the side reactions between the active materials and the electrolyte, and the lithium difluorophosphate compound of a small content cannot effectively stabilize the lithium salt, therefore, the cycle performance of batteries 4#, 5# and 7# at high temperature is still not improved.

In each of batteries 6#, 8# and 9#, the content of the cyanosulfone compound and/or the content of the lithium difluorophosphate compound are excessively great, so that the cyanosulfone compound and/or the lithium difluorophosphate compound remained in the electrolyte are too much, and the cyanosulfone compound continues reacting on the surface of the electrode plate and increases interface resistance, while the lithium difluorophosphate reduces conductivity of the electrolyte, therefore, the cycle performance of batteries 6#, 8# and 9# at high temperature is worsened.

In batteries 1~5, the content of the lithium difluorophosphate compound for each battery is 0.5%, and an addition of the cyanosulfone compound at a content of 0.05%~3% can form a compact and stable SEI film, so that the side reactions between the active materials and the electrolyte are prevented, thus batteries 1~5 after cycling have higher capacity retention rates at both high temperature and room temperature.

In batteries 4 and 6~9, the content of the cyanosulfone compound for each battery is 2%, and an addition of the lithium difluorophosphate compound at a content of 0.1%~2% can form a compact and stable SEI film, so that the side reactions between the active materials and the electrolyte are prevented, and thus the batteries after cycling at high temperature or room temperature have higher capacity retention rates. Similarly, batteries 10~19 show the same storage performance as above.

It can be seen from above that, when the electrolyte contains both the cyanosulfone compound and the lithium difluorophosphate compound, the battery will have higher capacity retention rate at both high temperature and room temperature and the battery will have excellent cycle performance at both high temperature and room temperature.

In summary, when the content of the cyanosulfone compound in the electrolyte is too large or too small, or the content of the lithium difluorophosphate compound in the electrolyte is too large or too small, it neither forms a compact and stable SEI film with a good interface property nor stabilizes the lithium salts, therefore, a battery hich has good cycle performance at both high temperature and room temperature cannot be formed. The battery has much more excellent cycle performance at high temperature when the electrolyte includes 0.05%~3% cyanosulfone compound and 0.001%~2% lithium difluorophosphate compound, particularly, when the electrolyte includes 0.1%~2.0% cyanosulfone compound and 0.1%~1% lithium difluorophosphate compound.

Embodiment 2: Preparation of Lithium-Ion Battery

The following lithium-ion batteries are prepared under the preparing conditions of embodiment 1, except that the additives in the electrolytes are different. In Table 4, the content of the cyanosulfone compound and the content of the lithium fluorophosphate is weight percentage calculated based on the total weight of the electrolyte.

TABLE 4

| Battery No. | Electrolyte No. | Cyanosulfone compound | | Lithium fluorophosphate compound | |
|---|---|---|---|---|---|
| | | Type | Content/% | Type | Content/% |
| Battery 20 | Electrolyte 20 | 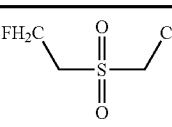 | 0.1 | lithium difluorophosphate | 0.01 |
| Battery 21 | Electrolyte 21 | 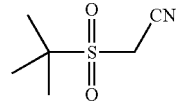 | 0.2 | lithium difluorophosphate | 0.05 |

TABLE 4-continued

| Battery No. | Electrolyte No. | Cyanosulfone compound Type | Content/% | Lithium fluorophosphate compound Type | Content/% |
|---|---|---|---|---|---|
| Battery 22 | Electrolyte 22 | 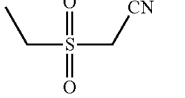 | 0.5 | lithium difluorophosphate | 0.05 |
| Battery 23 | Electrolyte 23 | 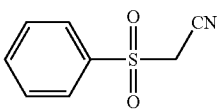 [SMILES: N#CCS(=O)(=O)c1ccccc1] | 1 | lithium monofluorophosphate | 0.25 |
| Battery 24 | Electrolyte 24 | 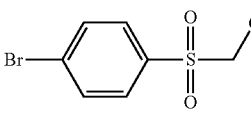 | 1 | lithium monofluorophosphate | 0.25 |
| Battery 25 | Electrolyte 25 | 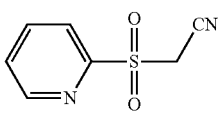 | 2 | lithium difluorophosphate | 0.5 |
| Battery 26 | Electrolyte 26 | 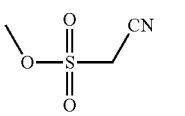 | 2 | lithium difluorophosphate | 0.5 |
| Battery 27 | Electrolyte 27 | 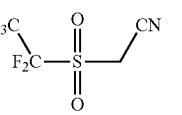 | 1.5 | lithium monofluorophosphate | 0.75 |
| Battery 28 | Electrolyte 28 | 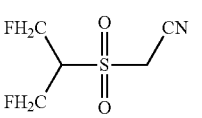 | 1.5 | lithium monofluorophosphate | 0.75 |
| Battery 29 | Electrolyte 29 | 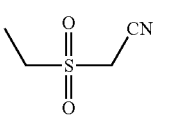 | 2 | lithium monofluorophosphate | 1 |
| Battery 30 | Electrolyte 30 | 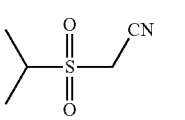 | 2 | lithium difluorophosphate | 1 |

Performance of the batteries prepared in embodiment 2 is similar to the performance of the batteries in embodiment 1, which will not be repeated herein.

Based on the disclosure above, those skilled in the art can make appropriate variations and modifications to the above embodiments. Therefore, the present application is not limited to the embodiments as disclosed and described above, the variations and modifications to the present application shall fall into the protection scope of the present application.

What is claimed is:

1. An electrolyte, comprising an organic solvent, a lithium salt and an additive, wherein the additive comprises additive A and additive B, the additive A is at least one cyanosulfone compound, and the additive B is at least one lithium fluorophosphate compound: wherein a structural formula of the cyanosulfone compound is shown as Formula I:

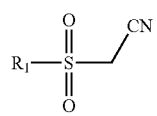

wherein $R_1$ is selected from a group consisting of halogen, $C_{1\sim20}$ alkyl, $C_{2\sim20}$ alkynel, $C_{6\sim26}$ aryl, $C_{5\sim26}$ heteroaryl, $C_{1\sim20}$ alkoxy, $C_{6\sim26}$ aryloxy, $C_{1\sim20}$ alkylsulfonyl, $C_{2\sim20}$ alkynelsulfonyl, $C_{6\sim26}$ arylsulfonyl, $C_{1\sim20}$ alkylsulfonyloxy and $C_{6\sim26}$ arylsulfonyloxy;

each of the $C_{1\sim20}$ alkyl, the $C_{2\sim20}$ alkynel, the $C_{6\sim26}$ aryl, the $C_{5\sim26}$ heteroaryl, the $C_{1\sim20}$ alkoxy, the $C_{6\sim26}$ aryloxy, the $C_{1\sim20}$ alkylsulfonyl, the $C_{2\sim20}$ alkynelsulfonyl, the $C_{6\sim26}$ arylsulfonyl, the $C_{1\sim20}$ alkylsulfonyloxy and the $C_{6-26}$ arylsulfonyloxy is substituted or unsubstituted by a substituting group; and the substituting group is selected from a group consisting of halogen.

2. The electrolyte according to claim 1, wherein $R_1$ in Formula I is selected from a group consisting of halogen, $C_{1-6}$ alkyl, $C_{6-12}$ aryl and $C_{5-11}$ heteroaryl, and each of the $C_{1-6}$ alkyl, the $C_{6-12}$ aryl and the $C_{5-11}$ heteroaryl is substituted or unsubstituted by a substituting group selected from a group consisting of halogen.

3. The electrolyte according to claim 1, wherein the cyanosulfone compound is selected from a group consisting of compounds shown as following structural formulas and combinations thereof;

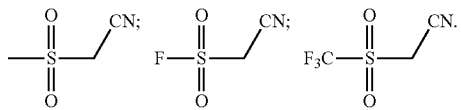

4. The electrolyte according to claim 1, wherein the lithium fluorophosphate compound is selected from a group consisting of lithium monofluorophosphate, lithium bifluorophosphate and combinations thereof.

5. The electrolyte according to claim 1, wherein a content of the cyanosulfone compound is 0.05%~3% by weight of the electrolyte.

6. The electrolyte according to claim 1, wherein a content of the lithium fluorophosphate compound is 0.001%~2% by weight of the electrolyte.

7. The electrolyte according to claim 1, wherein the organic solvent is selected from a group consisting of ethylene carbonate, propylene carbonate 2,3-butylene carbonate, fluoroethylene carbonate, ethylmethyl carbonate, dimethyl carbonate, diethyl carbonate, dipropyl carbonate, methyl propyl carbonate, ethyl propyl carbonate, γ-butyrolactone, methyl propionate, methyl butyrate, ethyl acetate, ethyl propionate, propyl propionate, ethyl butyrate and combinations thereof.

8. The electrolyte according to claim 1, wherein the lithium salt is selected from a group consisting of lithium hexafluorophosphate, lithium tetrafluoroborate, lithium perchlorate, lithium hexafluoroarsenate, lithium oxalyltetrafluoro phosphate (LiTFOP), $LiN(SO_2R_F)_2$, $LiN(SO_2F)SO_2R_F)$, lithium bis(trifluoromethanesulphonyl)imide, lithium bis(fluorosulfonyl)imide, lithium bis(oxalate)borate, lithium oxalyldifluoroborate and combinations thereof; wherein $R_F$=—$C_nF_{2n+1}$, n is an integer within 1~10.

9. A lithium-ion battery, comprising a positive electrode plate, a negative electrode plate, a separator and the electrolyte according to claim 1, wherein the positive electrode plate comprises a positive electrode active material, and the negative electrode plate comprises a negative electrode active material.

10. The electrolyte according to claim 1, wherein a content of the cyanosulfone compound is 0.1%~2% by weight of the electrolyte.

11. The electrolyte according to claim 1, wherein a content of the lithium fluorophosphate compound is 0.01%~1% by weight of the electrolyte.

12. The electrolyte according to claim 1, wherein the lithium salt is selected from a group consisting of $LiPF_6$, $LiN(SO_2R_F)_2$ and combinations thereof, wherein $R_F$=—$C_nF_{2n+1}$, n is an integer within 1~10.

13. The electrolyte according to claim 1, wherein a concentration of the lithium salt in the electrolyte is 0.5 $mol \cdot L^{-1}$~2 $mol \cdot L^{-1}$.

* * * * *